US012659107B2

(12) United States Patent
Tang et al.

(10) Patent No.: US 12,659,107 B2
(45) Date of Patent: Jun. 16, 2026

(54) METHOD FOR TRANSMITTING DATA IN INTERNET OF VEHICLES, TERMINAL DEVICE AND NETWORK DEVICE

(71) Applicant: GUANGDONG OPPO MOBILE TELECOMMUNICATIONS CORP., LTD., Dongguan (CN)

(72) Inventors: Hai Tang, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/921,667

(22) Filed: Jul. 6, 2020

(65) Prior Publication Data

US 2020/0336276 A1      Oct. 22, 2020

Related U.S. Application Data

(63) Continuation of application No. PCT/CN2018/100790, filed on Aug. 16, 2018.

(30) Foreign Application Priority Data

Jan. 4, 2018    (WO) ................ PCT/CN2018/071371

(51) Int. Cl.
*H04L 5/00*        (2006.01)
*H04L 5/10*        (2006.01)
(Continued)

(52) U.S. Cl.
CPC .............. *H04L 5/0051* (2013.01); *H04L 5/10* (2013.01); *H04W 4/40* (2018.02); *H04W 72/02* (2013.01);
(Continued)

(58) Field of Classification Search
None
See application file for complete search history.

(56) References Cited

U.S. PATENT DOCUMENTS

2009/0245196 A1    10/2009  Iseda
2016/0087774 A1     3/2016  Guo et al.
(Continued)

FOREIGN PATENT DOCUMENTS

CN        101043718 A      9/2007
CN        102149082 A      8/2011
(Continued)

OTHER PUBLICATIONS

Guangdong OPPO Mobile Telecommunications Corp. Ltd., Extended European Search Report, EP18898537.8, Jan. 11, 2021, 9 pgs.
(Continued)

*Primary Examiner* — Christine T Duong
(74) *Attorney, Agent, or Firm* — Morgan, Lewis & Bockius LLP

(57)        ABSTRACT

Disclosed by the embodiment of the present application are a method for transmitting data in the Internet of Vehicles, a terminal device and a network device, the method comprising: a terminal device determining a demodulation reference signal (DMRS) pattern corresponding to a first channel; and the terminal device demodulating the first channel according to the DMRS pattern.

9 Claims, 3 Drawing Sheets

(51) Int. Cl.

| | | |
|---|---|---|
| *H04W 4/40* | (2018.01) | |
| *H04W 72/02* | (2009.01) | |
| *H04W 72/044* | (2023.01) | |
| *H04W 92/18* | (2009.01) | |

(52) U.S. Cl.
CPC ........ *H04W 72/0466* (2013.01); *H04W 92/18* (2013.01)

(56) References Cited

U.S. PATENT DOCUMENTS

| | | | | |
|---|---|---|---|---|
| 2017/0156134 A1 * | 6/2017 | Zhao | ................... | H04L 5/0053 |
| 2017/0332390 A1 | 11/2017 | Li et al. | | |
| 2018/0035406 A1 * | 2/2018 | Hao | ...................... | H04L 5/0046 |
| 2019/0036738 A1 * | 1/2019 | Miao | ...................... | H04L 25/02 |
| 2019/0141675 A1 * | 5/2019 | Blasco Serrano | .... | H04W 72/02 |
| 2019/0229964 A1 * | 7/2019 | Ouchi | ................... | H04L 5/0051 |

FOREIGN PATENT DOCUMENTS

| | | | | | |
|---|---|---|---|---|---|
| CN | 103873215 | A | 6/2014 | | |
| CN | 104081872 | A | 10/2014 | | |
| CN | 104125186 | A | 10/2014 | | |
| CN | 104322090 | A | 1/2015 | | |
| CN | 105634707 | A | 6/2016 | | |
| CN | 106105085 | A | 11/2016 | | |
| CN | 107005958 | A | 8/2017 | | |
| CN | 107046457 | A | 8/2017 | | |
| CN | 107113894 | A | 8/2017 | | |
| EP | 3855674 | A1 * | 7/2021 | ......... | H04L 25/0202 |
| JP | 2017139661 | A | 8/2017 | | |
| WO | WO2014113969 | A1 | 7/2014 | | |
| WO | WO2014113971 | A1 | 7/2014 | | |
| WO | WO2016195411 | A1 | 12/2016 | | |
| WO | WO 2017011079 | A1 | 1/2017 | | |
| WO | WO-2017026975 | A1 * | 2/2017 | ........... | H04L 5/0007 |
| WO | WO2017052489 | A1 | 3/2017 | | |
| WO | WO-2017052823 | A1 * | 3/2017 | ......... | H04L 25/0256 |
| WO | WO2017057870 | A1 | 4/2017 | | |
| WO | WO-2017178993 | A1 * | 10/2017 | ........ | H04L 27/2607 |
| WO | WO2020033704 | A1 | 2/2020 | | |

OTHER PUBLICATIONS

Sony, Discussion on DMRS enhancement and operation for V2V, 3GPP TSG RAN WG1 Meeting #84bis, R1-162559, Busan, Korea, Apr. 11-15, 2016, 3 pgs.

Guangdong OPPO Mobile Telecommunications Corp. Ltd., International Search Report and Written Opinion, PCT/CN2018/071371, Sep. 27, 2018, 11 pgs.

Ericsson, Considerations on the LTE V2X Feasibility Study, 3GPP TSG-RAN WG1 Meeting #82, R1-154434, Beijing, China, Aug. 28, 2015, 5 pgs.

Guangdong OPPO Mobile Telecommunications Corp. Ltd., International Search Report and Written Opinion, PCT/CN2018/071371, Sep. 11, 2018, 11 pgs.

Guangdong OPPO Mobile Telecommunications Corp. Ltd., International Search Report and Written Opinion, PCT/CN2018/100790, Nov. 1, 2018, 11 pgs.

ZTE, DM-RS enhancement for V2V, 3GPP TSG-RAN WG1 Meeting #82bis, R1-155233, Malmo, Sweden, Oct. 9, 2015, 3 pgs.

Guangdong OPPO Mobile Telecommunications Corp. Ltd., Second Office Action, CN202010899202.X, Dec. 7, 2021, 26 pgs.

Guangdong OPPO Mobile Telecommunications Corp. Ltd., Communication Pursuant to Article 94(3), EP18898537.8, Sep. 30, 2021, 5 pgs.

Intel Corporation, "On PSSCH DMRS Signal Generation and Performance Analysis," 3GPP TSG RAN1 WG Meeting #88, R1-1702138, Athens, Greece, Feb. 13-17, 2017, 5 pgs.

Intel Corporation, "PSSCH DMRS generation for sidelink V2V communication," 3GPP TSG RAN WG1 Meeting #87, R1-1611919, Reno, NV, USA Nov. 14-18, 2016, 3 pgs.

Xu Xiayan, et al., "The LTE V2X Standard Is Initially Ready To Promote The Development of The Internet of Vehicles Industry," Communications World, Jan. 25, 2017, 5 pgs.

Yang Xiuqing, et al., "Estimating Terminal Velocity of Base Station Based on Channel Information in Frequency Domain," Journal of Data Acquisition and Processing, Nov. 15, 2016, 14 pgs.

Guangdong OPPO Mobile Telecommunications Corp. Ltd., Requisition by Examiner, CA3087605, Aug. 10, 2021, 6 pgs.

Guangdong OPPO Mobile Telecommunications Corp. Ltd., First Office Action, CN202010899202.X, Sep. 2, 2021, 30 pgs.

Guangdong OPPO Mobile Telecommunications Corp. Ltd., Examination Report, IN202017032283, Jul. 8, 2021, 7 pgs.

Intel Corporation, "Signaling Details for eNB Controlled Sidelink V2V Communication," 3GPP TSG RAN WG1 Meeting #84bis, R1-162364, Busan, Korea Apr. 11-15, 2016, 8 pgs.

Intel Corporation, "On DMRS physical structure enhancements for PSCCH and PSSCH," 3GPP TSG RAN WH1 Meeting #85 R1-164134, Nanjing, China May 23-27, 2016, 11 pgs.

Meng Yan, et al., Research of Noise Estimation Algorithm Based on DMRS in LTE-A System, Shanxi Electronic Technology, Dec. 15, 2013, 9 pgs.

Guangdong OPPO Mobile Telecommunications Corp. Ltd., First Office Action, JP2020-537001, Jun. 28, 2022, 10 pgs.

Guangdong OPPO Mobile Telecommunications Corp. Ltd., Office Action, CA3,087,605, Sep. 20, 2022, 5 pgs.

Guangdong OPPO Mobile Telecommunications Corp. Ltd., Communication Pursuant to Article 94(3), EP18898537.8, 22MAR2022, 6 pgs.

Guangdong OPPO Mobile Telecommunications Corp. Ltd., First Office Action, TW108100250, 14FEB2022, 12 pgs.

Guangdong OPPO Mobile Telecommunications Corp. Ltd., JP2020-537001, Decision of Rejection, Nov. 15, 2022, 5 pgs.

Guangdong OPPO Mobile Telecommunications Corp. Ltd., EP23154180.6, Extended European Search Report, May 8, 2023, 10 pgs.

Guangdong OPPO Mobile Telecommunications Corp. Ltd., AU2018399356, First Office Action, Aug. 1, 2023, 3 pgs.

Guangdong OPPO Mobile Telecommunications Corp. Ltd., CA3,087,605, Notice of Allowance, Sep. 14, 2023, 1 pg.

Guangdong OPPO Mobile Telecommunications Corp. Ltd., AU2018399356, Notice of Allowance, Dec. 4, 2023, 3 pgs.

Guangdong OPPO Mobile Telecommunications Corp. Ltd., IN202017032283, Hearing Notice, Dec. 19, 2023, 4 pgs.

Guangdong OPPO Mobile Telecommunications Corp. Ltd., BR112020013675-1, First Office Action, Apr. 3, 2024, 8 pgs.

Guangdong OPPO Mobile Telecommunications Corp. Ltd., KR10-2020-7022488, First Office Action, Apr. 26, 2024, 8 pgs.

Intel Corporation, "Support of 64QAM for LTE V2V sidelink communication", 3GPP TSG RAN WG1 Meeting #90bis, Prague, Czech Republic, Oct. 9-13, 2017, R1-1717332, 8 pgs.

Guangdong OPPO Mobile Telecommunications Corp. Ltd., MX/a/2020/007065, First Office Action, Jun. 4, 2024, 6 pgs.

Guangdong OPPO Mobile Telecommunications Corp. Ltd., MX/a/2020/007065, Notice of Allowance, Sep. 18, 2024, 6 pgs.

Guangdong OPPO Mobile Telecommunications Corp. Ltd., KR10-2020-7022488, Notice of Allowance, Dec. 2, 2024, 6 pgs.

Samsung, "Views on Tx diversity transmission in V2X", 3GPP TSG RAN WG1 Meeting #90, R1-1713533, Prague, Czechia Aug. 21-25, 2017, 3 pgs.

Guangdong OPPO Mobile Telecommunications Corp. Ltd., CN201880084893.9, First Office Action, Dec. 9, 2024, 39 pgs.

Guangdong OPPO Mobile Telecommunications Corp., EP23154180.6, European First Office Action, Jul. 28, 2025, 4 pgs.

Guangdong Oppo Mobile Telecommunications Corp., Ltd., BR112020013675-1, Second Office Action, Feb. 6, 2026, 14 pgs.

Guangdong Oppo Mobile Telecommunications Corp, Ltd., EP23154180.6, Second Office Action, Mar. 25, 2026, 6 pgs.

* cited by examiner

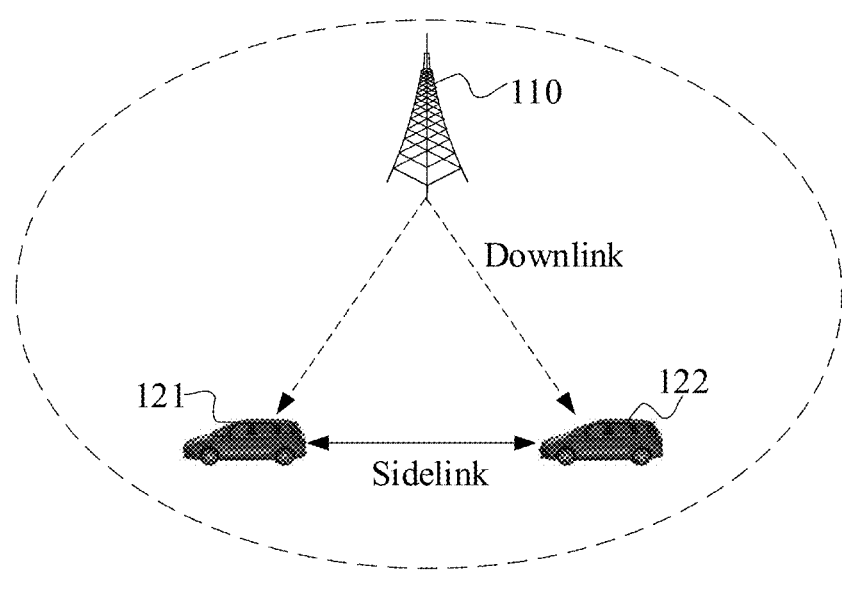

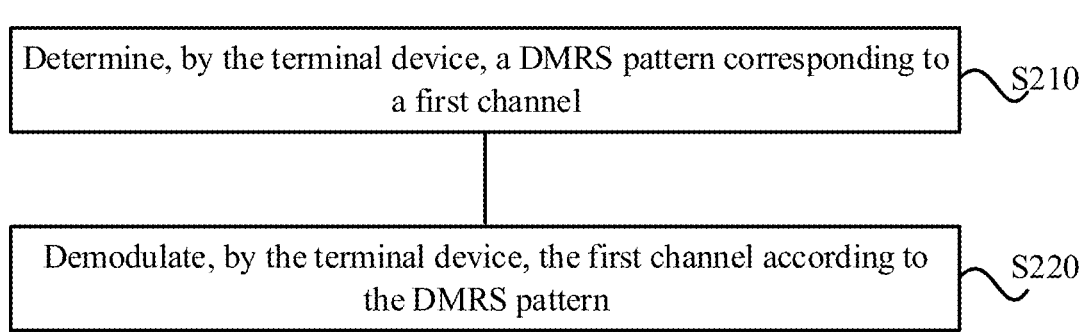

| Determine, by the terminal device, a DMRS pattern corresponding to a first channel | S210 |
| Demodulate, by the terminal device, the first channel according to the DMRS pattern | S220 |

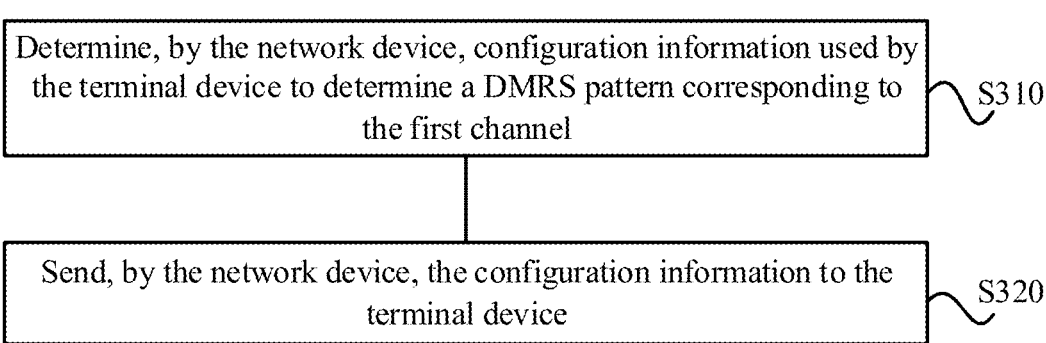

| Determine, by the network device, configuration information used by the terminal device to determine a DMRS pattern corresponding to the first channel | S310 |
| Send, by the network device, the configuration information to the terminal device | S320 |

FIG. 3

METHOD FOR TRANSMITTING DATA IN INTERNET OF VEHICLES, TERMINAL DEVICE AND NETWORK DEVICE

CROSS-REFERENCE TO RELATED APPLICATIONS

The present application is a continuation application of the PCT application No. PCT/CN2018/100790, filed before China National Intellectual Property Administration (CNIPA) on Aug. 16, 2018 and titled with "METHOD FOR TRANSMITTING DATA IN INTERNET OF VEHICLES, TERMINAL DEVICE AND NETWORK DEVICE", which claims the priority of the PCT application No. PCT/CN2018/071371, filed before CNIPA on Jan. 4, 2018 and titled with "METHOD FOR TRANSMITTING DATA IN INTERNET OF VEHICLES, TERMINAL DEVICE AND NETWORK DEVICE", the entire contents of both of which are incorporated herein by reference.

TECHNICAL FIELD

Embodiments of the present application relate to the field of communications, and more specifically, to a method, a terminal device, and a network device for transmitting data in Internet of Vehicles (IoV).

BACKGROUND

The IoV system belongs to a sidelink (SL) transmission technology based on long term evolution device-to-device (LTE D2D). Different from the typical LTE system, in which the communication data is received or sent through a base station, a manner of direct device-to-device communication is adopted in the IoV system, thereby having higher spectral efficiency and lower transmission delay.

In the 5G New Radio (NR) system, two transmission waveforms are supported in the uplink transmission. When the terminal device uses different transmission waveforms, the corresponding demodulation reference signal (DMRS) patterns are different. However, in the IoV system based on the NR technology (NR-V2X), the environment in which the vehicle is located is complex and changeable. How to realize the flexible configuration of the DMRS pattern is an urgent problem to be solved.

SUMMARY

There are provided a method, a terminal device and a network device for transmitting data in IoV, so as to achieve flexible configuration of DMRS pattern.

According a first aspect, there is provided a method for transmitting data in IoV, including:

determining, by a terminal device, a DMRS pattern corresponding to a first channel; and demodulating, by the terminal device, the first channel according to the DMRS pattern, wherein the first channel is a physical sidelink share channel (PSSCH).

In some possible embodiments, the determining, by a terminal device, a DMRS pattern corresponding to a first channel includes:

determining, by the terminal device, the DMRS pattern corresponding to the first channel according to at least one of configuration information sent by a network device, a resource pool used by the first channel, a carrier used by the first channel, or a waveform used by the first channel.

Therefore, based on the method for transmitting data in IoV according to embodiments of the application, the DMRS pattern corresponding to the first channel can be determined by the terminal device according to at least one of configuration of the network device, or a resource pool, a carrier or a waveform used for transmitting the first channel, thereby achieving flexible configuration of the DMRS pattern.

In some possible embodiments, the determining, by the terminal device, the DMRS pattern corresponding to the first channel according to at least one of configuration information sent by a network device, a resource pool used by the first channel, a carrier used by the first channel, or a waveform used by the first channel includes:

determining, by the terminal device when the configuration information indicates a first DMRS pattern, the first DMRS pattern from a plurality of DMRS patterns as the DRMS pattern corresponding to the first channel.

In some possible embodiments, the plurality of DMRS patterns are pre-configured in the terminal device or configured by the network device.

In some possible embodiments, the determining, by the terminal device, the DMRS pattern corresponding to the first channel according to at least one of configuration information sent by a network device, a resource pool used by the first channel, a carrier used by the first channel, or a waveform used by the first channel includes:

determining, by the terminal device, the DMRS pattern corresponding to the first channel according to the resource pool used by the first channel and a first corresponding relationship, wherein the first corresponding relationship is a corresponding relationship between a plurality of resource pools and a plurality of DMRS patterns.

Optionally, the corresponding relationship between the plurality of resource pools and the plurality of DMRS patterns may be in the manner of one-to-one, one-to-many, many-to-one or many-to-many, which is not limited by embodiments of the application.

In some possible embodiments, the plurality of resource pools respectively correspond to a plurality of speed ranges, and the method further includes:

determining, by the terminal device, a corresponding target resource pool according to a current moving speed, wherein the target resource pool is the resource pool used by the first channel.

Optionally, when the terminal device is currently in a high-speed scenario and the channel changes rapidly, the network device may configure the terminal device with DMRS patterns having greater density in the time domain, which is conducive to the terminal device for more accurate channel estimation, thereby improving data reception performance. Optionally, when the terminal device is currently in a low-speed scenario and the channel change is slow, the network device may configure the terminal device with DMRS patterns sparsely distributed in the time domain, which is beneficial to reduce the overhead of DMRS. Accordingly, based on the method for transmitting data in IoV according to embodiments of the application, a reasonable balance between reception performance and pilot overhead can be achieved.

In some possible embodiments, the first corresponding relationship is pre-configured in the terminal device or configured by the network device.

In some possible embodiments, the determining, by the terminal device, the DMRS pattern corresponding to the first channel according to at least one of configuration information sent by a network device, a resource pool used by the first channel, a carrier used by the first channel, or a waveform used by the first channel includes:

determining, by the terminal device, the DMRS pattern corresponding to the first channel according to the carrier used by the first channel and a second corresponding relationship, wherein the second corresponding relationship is a corresponding relationship between a plurality of carriers and a plurality of DMRS patterns.

Optionally, the corresponding relationship between the plurality of carriers and the plurality of DMRS patterns may be in the manner of one-to-one, one-to-many, many-to-one or many-to-many, which is not limited by embodiments of the application.

In some possible embodiments, the second corresponding relationship is pre-configured in the terminal device or configured by the network device.

In some possible embodiments, the determining, by the terminal device, the DMRS pattern corresponding to the first channel according to at least one of configuration information sent by a network device, a resource pool used by the first channel, a carrier used by the first channel, or a waveform used by the first channel includes:

determining, by the terminal device, the DMRS pattern corresponding to the first channel according to the waveform used by the first channel and a third corresponding relationship, wherein the third corresponding relationship is a corresponding relationship between a plurality of waveforms and a plurality of DMRS patterns.

Optionally, the corresponding relationship between the plurality of waveforms and the plurality of DMRS patterns may be in the manner of one-to-one, one-to-many, many-to-one or many-to-many, which is not limited by embodiments of the application.

In some possible embodiments, the third corresponding relationship is pre-configured in the terminal device or configured by the network device.

In some possible embodiments, the determining, by a terminal device, a DMRS pattern corresponding to a first channel includes:

determining, by the terminal device, the DMRS pattern corresponding to the first channel according to a numerology used by the first channel.

In some possible embodiments, the determining, by the terminal device, the DMRS pattern corresponding to the first channel according to a numerology used by the first channel includes:

determining, by the terminal device, the DMRS pattern corresponding to the first channel according to the numerology used by the first channel and a fourth corresponding relationship, wherein the fourth corresponding relationship is a corresponding relationship between a plurality of numerologies and a plurality of DMRS patterns.

In some possible embodiments, the fourth corresponding relationship is pre-configured in the terminal device or configured by the network device.

In some possible embodiments, the numerology includes at least one of following information: information on subcarrier spacing size, a cyclic prefix (CP) type, or a CP length.

In some possible embodiments, the first channel is a physical sidelink share channel (PSSCH), or the first channel is a physical sidelink control channel (PSCCH).

In some possible embodiments, the first channel is a physical sidelink share channel (PSSCH), a physical sidelink control channel (PSCCH) corresponding to the first channel is a second channel, and the determining, by a terminal device, a DMRS pattern corresponding to a first channel includes:

determining, by the terminal device, the DMRS pattern corresponding to the first channel according to the second channel.

In some possible embodiments, the second channel includes indication information used for indicating a second DRMS pattern, and the determining, by the terminal device, the DMRS pattern corresponding to the first channel according to the second channel includes:

determining, by the terminal device, a second DMRS pattern indicated by the indication information as the DMRS pattern corresponding to the first channel.

In some possible embodiments, the determining, by the terminal device, the DMRS pattern corresponding to the first channel according to the second channel includes:

determining, by the terminal device, the DMRS pattern corresponding to the first channel according to at least one of a sequence, a cyclic shift, an orthogonal cover code (OCC), a resource position, or a root sequence of DMRS corresponding to the second channel.

In some possible embodiments, the determining, by the terminal device, the DMRS pattern corresponding to the first channel according to the second channel includes:

determining, by the terminal device, the DMRS pattern corresponding to the first channel according to scrambling code information of the second channel.

In some possible embodiments, the DMRS pattern includes at least one of:

a number of an orthogonal frequency division multiplexing (OFDM) symbol occupied by DRMS within one time unit;

a position of an OFDM symbol occupied by DRMS within one time unit;

a number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

According to a second aspect, there is provided a method for transmitting data in IoV, including:

determining, by a network device, configuration information, wherein the configuration information is used by a terminal device to determine a demodulation reference signal (DMRS) pattern corresponding to a first channel; and sending, by the network device, the configuration information to the terminal device.

In some possible embodiments, the configuration information is used for indicating a first DMRS pattern among a plurality of DMRS patterns.

In some possible embodiments, the method further includes:

configuring, by the network device, the terminal device with the plurality of DRMS patterns.

In some possible embodiments, the configuration information is used for indicating a first corresponding relationship, the first corresponding relationship being a corresponding relationship between a plurality of resource pools and a plurality of DMRS patterns.

In some possible embodiments, the configuration information is used for indicating a second corresponding relationship, the second corresponding relationship being a corresponding relationship between a plurality of carriers and a plurality of DMRS patterns.

In some possible embodiments, the configuration information is used for indicating a third corresponding relationship, the third corresponding relationship being a corresponding relationship between a plurality of waveforms and a plurality of DMRS patterns.

In some possible embodiments, the configuration information is used for indicating a fourth corresponding relationship, the fourth corresponding relationship being a corresponding relationship between a plurality of numerologies and a plurality of DMRS patterns.

In some possible embodiments, the numerology includes at least one of following information: information on sub-carrier spacing size, a cyclic prefix (CP) type, or a CP length.

In some possible embodiments, the first channel is a physical sidelink control channel (PSCCH).

In some possible embodiments, the first channel is a physical sidelink share channel (PSSCH), and a physical sidelink control channel (PSCCH) corresponding to the first channel is a second channel.

In some possible embodiments, the configuration information is used for indicating a corresponding relationship between at least one of a sequence, a cyclic shift, an orthogonal cover code (OCC), a resource position, or a root sequence of DMRS corresponding to the second channel and a DMRS sequence.

In some possible embodiments, the configuration information is used for indicating a corresponding relationship between scrambling code information of the second channel and a DMRS sequence.

In some possible embodiments, the configuration information is used for indicating a corresponding relationship between mask code information of the second channel and a DMRS sequence.

In some possible embodiments, the DMRS pattern includes at least one of:

a number of an orthogonal frequency division multiplexing (OFDM) symbol occupied by DRMS within one time unit;

a position of an OFDM symbol occupied by DRMS within one time unit;

a number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

According to a third aspect, a terminal device is provided for performing the method according to the first aspect or any possible embodiment thereof. Specifically, the terminal device includes a unit for performing the method according to the first aspect or any possible embodiment thereof.

According to a fourth aspect, a network device is provided. The network device includes: a memory, a processor, an input interface, and an output interface. In an embodiment, the memory, the processor, the input interface and the output interface are connected through a bus system. The memory is configured to store instructions, and the processor is configured to execute the instructions stored in the memory, thereby performing the method according to the first aspect or any possible embodiment thereof.

According to a fifth aspect, a terminal device is provided for performing the method according to the second aspect or any possible embodiment thereof. Specifically, the terminal device includes a unit for performing the method according to the second aspect or any possible embodiment thereof.

According to a sixth aspect, a network device is provided. The network device includes: a memory, a processor, an input interface, and an output interface. In an embodiment, the memory, the processor, the input interface and the output interface are connected through a bus system. The memory is configured to store instructions, and the processor is configured to execute the instructions stored in the memory, thereby performing the method according to the second aspect or any possible embodiment thereof.

According to a seventh aspect, a non-transitory computer-readable storage medium is provided for storing computer software instructions for performing the method according to the first aspect or any possible embodiment thereof, which includes a program designed for performing the above method.

According to an eighth aspect, there is provided a computer program product including instructions which, when running on a computer, causes a computer to perform the method according to the first aspect or any possible embodiment thereof.

According to a ninth aspect, a non-transitory computer-readable storage medium is provided for storing computer software instructions for performing the method according to the second aspect or any possible embodiment thereof, which includes a program designed for performing the above method.

According to a tenth aspect, there is provided a computer program product including instructions which, when running on a computer, causes a computer to perform the method according to the second aspect or any possible embodiment thereof.

According to an eleventh aspect, a chip is provided for performing the method according to any one of the first to second aspects or any impossible embodiments thereof. Specifically, the chip includes: a processor configured to call and run a computer program from a memory, causing a device installed with the chip to perform the method according to any one of the first to second aspects or any impossible embodiments thereof.

BRIEF DESCRIPTION OF THE DRAWINGS

FIG. 1 is a schematic diagram illustrating an application scenario according to an embodiment of the present application.

FIG. 2 is a schematic flowchart illustrating a method for transmitting data in IoV according to an embodiment of the present application.

FIG. 3 is a schematic flowchart illustrating a method for transmitting data in IoV according to another embodiment of the present application.

DETAILED DESCRIPTION

Figure 4:
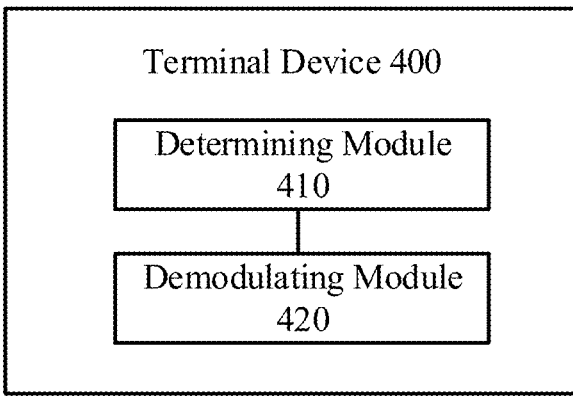
FIG. 4 is a block diagram illustrating a terminal device according to an embodiment of the present application.

The technical solutions in the embodiments of the present application will be described below with reference to the drawings in the embodiments of the present application.

It should be understood that the technical solutions of the embodiments of the present application may be applied to various communication systems, for example, LTE system, LTE frequency division duplex (FDD) system, LTE time division duplex (TDD), the 4.5-th generation (4.5G) network, the 5-th generation (5G) network, new radio (NR), and the like. The embodiments of the present application can also be applied to a vehicle to everything (V2X) system, such as a vehicle to vehicle (V2V) system; or, it can also be applied to a device to device (D2D) system, and the embodiments of the present application are not limited thereto.

It should be understood that the terminal device in the embodiments of the present application may also be referred to as terminal, user equipment (UE), mobile station (MS), mobile terminal (MT), and so on. The terminal device may be a vehicle user equipment (VUE), such as a wireless terminal in a vehicle or self-driving vehicle; or, the terminal device may also be a pedestrian user equipment (PUE), for example, a mobile phone, a tablet computer, a computer with wireless transceiver functions, and the like.

It should be understood that the network device involved in the embodiments of the present application is a device deployed in a wireless access network to provide wireless communication functions for terminal devices. The network device may be a base station, and the base station may include various forms of macro base stations, micro base stations, relay stations, and access points. In systems using different wireless access technologies, the names of devices with base station functions may be different. For example, in the LTE network, it is referred to as evolved node B (eNB or eNodeB); while in the 3rd Generation (3G) network, it is referred to as Node B and so on.

FIG. 1 is a schematic diagram illustrating an application scenario according to an embodiment of the present application. As shown in FIG. 1, the embodiments of the present application can be applied to various application scenarios. Here, a network device and a terminal device in the IoV system are used as examples for illustration, where the network device may be a base station 110 and the terminal device may be a vehicle-mounted terminal, for example, vehicle 121 and vehicle 122.

In the IoV system, control information can be exchanged between vehicles through the Physical Sidelink Control Channel (PSCCH), and data information can be exchanged there between through the Physical Sidelink Shared Channel (PSSCH). The DMRS pattern can be used for the related demodulation of PSCCH or PSSCH, that is, the PSCCH or PSSCH can be demodulated according to the DMRS pattern to obtain control information carried on the PSCCH or data information carried on the PSSCH.

In the IoV system, the environment where the vehicle is located is complex and changeable. For example, the vehicle may be in a high-speed scenario or a traffic jammed urban scene. Different scenarios have different requirements for DRMS. Therefore, it is a to-be-researched issue to implement a flexible configuration of DMRS.

In view of above, the embodiments of the present application provide a method for transmitting data in IoV, which can realize the flexible configuration of DMRS.

FIG. 2 is a schematic flowchart illustrating a method for transmitting data in IoV according to an embodiment of the present application. The method 200 may be performed by a terminal device in the IoV system, for example, the in-vehicle terminal 121 or in-vehicle terminal 122 shown in FIG. 1. As shown in FIG. 2, the method 200 includes following steps.

S210, the terminal device determines a DMRS pattern corresponding to a first channel.

S220, the terminal device demodulates the first channel according to the DMRS pattern.

Optionally, in an embodiment of the present application, the first channel may be a control channel in the IoV system, that is, a channel used for exchanging control information between vehicles, for example, the PSCCH; or may also be a data channel in the IoV system, that is, a channel used for exchanging data between vehicles, for example, the PSSCH, which is not limited in this embodiment of the present application.

Optionally, the terminal device may determine the DMRS pattern used for demodulating the first channel according to configuration of a network device, a specific parameter, or specific information. For example, the specific parameter may include a parameter of the environment where the terminal device is located. For example, the terminal device may determine to use densely distributed DMRS patterns when the current environment is a high-speed scenario, or determine to use sparsely distributed DMRS patterns in a low-speed scenario. The specific information may include information on a moving speed of the terminal device and the like. For example, the terminal device may determine to use densely distributed DMRS patterns when the current moving speed is greater than a first speed threshold, or the terminal device may determine to use sparsely distributed DMRS patterns when the current moving speed is smaller than a second speed threshold. As an example without limitation, the first speed threshold may be 80 km/h, and the second speed threshold may be 30 km/h, the embodiments of the present application are not limited thereto.

Optionally, in an embodiment of the present application, the DMRS pattern includes at least one of the following:

1. the number of Orthogonal Frequency Division Multiple Access (OFDM) symbols occupied by DRMS within one time unit, that is, the number of DMRS symbols included in one time unit;

2. the position of the OFDM symbol occupied by the DRMS in one time unit, that is, the position occupied by the DMRS symbol in one time unit, for example, which OFDM symbol is occupied in a subframe or a time slot;

3. the number of resource elements (REs) occupied by DMRS in one physical resource block (PRB) within one OFDM symbol occupied by the DMRS;

4. a frequency domain interval between DMRS symbols in one PRB within one OFDM symbol occupied by the DMRS, for example, when one PRB includes three DMRS symbols, and every two DMRS symbols are separated by 3 REs, then this parameter can be used for indicating 3 REs;

5. an offset of the DMRS symbol in a PRB relative to the first subcarrier in the PRB within one OFDM symbol occupied by the DMRS, for example, one PRB includes three DMRS symbols, this parameter can be used for indicating the offset of the first DMRS symbol in the PRB relative to the first subcarrier (i.e., the subcarrier 0) in the PRB;

6. a frequency domain position of DMRS within one OFDM symbol occupied by the DMRS, that is, which frequency domain positions are occupied by the DMRS within one OFDM symbol, for example, within the frequency domain range of a PRB, the DMRS symbol can occupy all REs, and may also occupy positions of odd REs or positions of even REs, the embodiments of the present application are not limited thereto;

7. whether an RE, not occupied by DMRS in an OFDM symbol where the DMRS is located, can be used for transmitting other signals than the DMRS. In an embodiment, the DMRS may not completely occupy all REs in the symbol where the DMRS is located, those REs that are not occupied by DMRS may be or may be not used for transmitting data. This parameter can be used for indicating whether those REs not occupied by DMRS symbols can be used to for transmitting other signals, such as PSCCH, PSSCH or the like.

It should be understood that a time unit may include one or more subframes, one or more time slots, and the like, which is not limited in this embodiment of the present application.

Optionally, in some embodiments, S210 may include a following step.

The terminal device determines the DMRS pattern corresponding to the first channel according to at least one of configuration information sent by the network device, a resource pool used by the first channel, a carrier used by the first channel, or a waveform used by the first channel.

It should be understood that among the above-identified information, as to which information is used by the terminal device to determine the DMRS pattern corresponding to the first channel, it may be configured by the network device or determined by the terminal device itself. In other words, the terminal device may determine, by itself, the DMRS pattern corresponding to the first channel according to the resource pool, the carrier or the waveform used by the first channel; or may determine, based on the configuration of the network device, the DMRS pattern corresponding to the first channel according to the resource pool, the carrier or the waveform used by the first channel. The embodiments are not limited thereto.

The manner of determining the DMRS pattern corresponding to the first channel will be described in detail with reference to embodiments 1 to 4 as follows.

In the embodiment 1, the terminal device determines the DMRS pattern corresponding to the first channel according to the configuration of the network device.

Optionally, the terminal device determining the DMRS pattern corresponding to the first channel according to at least one of configuration information sent by the network device, a resource pool used by the first channel, a carrier used by the first channel, or a waveform used by the first channel includes a following step.

The terminal device determines, when the configuration information indicates a first DMRS pattern, the first DMRS pattern from a plurality of DMRS patterns as the DRMS pattern corresponding to the first channel.

Specifically, the network device may learn the current environment of the terminal device. For example, the terminal device may report the current geographical location information to the network device, so that the network device can determine, based on the current geographical location information of the terminal device, the environmental information of the geographic location when the network is deployed, such as a high-speed scenario, an urban scenario, or the like. Then, the network device can configure the terminal device with a corresponding DMRS pattern based on the determined environmental information. Optionally, the network device may also learn the current moving speed of terminal device. For example, the terminal device may report the current moving speed information to the network device, so that the network device may configure the terminal device with a corresponding DMRS pattern according to the current moving speed of the terminal device.

For example, when the terminal device is currently in the high-speed scenario where the channel changes rapidly, the network device may configure the terminal device with more densely distributed DMRS patterns in the time domain, which helps the terminal device to more accurately perform channel estimation, thereby improving data reception performance. For another example, when the terminal device is currently in a low-speed scenario where the channel change is slow, the network device may configure the terminal device with sparsely distributed DMRS patterns in the time domain, which is beneficial to reduce the overhead of the DMRS. Accordingly, based on the method for transmitting data in IoV according to embodiments of the application, a reasonable balance between reception performance and pilot overhead can be achieved.

Optionally, a plurality of DMRS patterns may be configured in the terminal device. The plurality of DMRS patterns may be pre-configured in the terminal device, or may be configured by the network device, which is not limited in this embodiment of the present application. For example, the network device may configure the terminal device with the plurality of DRMS patterns through a broadcast message or radio resource control (RRC) signaling. The network device may select, from the plurality of DMRS patterns, a first DMRS pattern as the DMRS pattern used by the first channel of the terminal device. Further, the network device may send configuration information to the terminal device. Optionally, the network device may send the configuration information to the terminal device by sending a broadcast message, RRC signaling, or physical layer control signaling, which is not limited in this embodiment of the present application. The configuration information is used for indicating the first DMRS pattern selected by the network device from the plurality of DMRS patterns. For example, the configuration information may be directly indicative of identification information of the first DMRS pattern (e.g., an index), such that the terminal device, after receiving the configuration information, can acquire the first DMRS pattern from the plurality of DMRS patterns and, further, can perform data transmission according to the first DMRS pattern.

In the embodiment 2, the terminal device determines the DMRS pattern corresponding to the first channel according to the resource pool used by the first channel.

Optionally, the terminal device determining the DMRS pattern corresponding to the first channel according to at least one of configuration information sent by the network device, a resource pool used by the first channel, a carrier used by the first channel, or a waveform used by the first channel includes a following step.

The terminal device determines the DMRS pattern corresponding to the first channel according to the resource pool used by the first channel and a first corresponding relationship, where the first corresponding relationship is a corresponding relationship between a plurality of resource pools and a plurality of DMRS patterns.

In other words, in this embodiment 2, there is a corresponding relationship between the plurality of resource pools and the plurality of DMRS patterns. The terminal device can determine a corresponding DMRS pattern according to the resource pool used for transmitting the first channel in combination with the first corresponding relationship, and then demodulate the first channel according to the DMRS pattern.

Optionally, the corresponding relationship between the plurality of resource pools and the plurality of DMRS patterns may be in the manner of one-to-one, one-to-many (e.g., one resource pool corresponds to two DMRS patterns), many-to-one (e.g., two resource pools correspond to one DMRS patterns) or many-to-many (e.g., two resource pools correspond to two DMRS patterns), which is not limited by embodiments of the application.

Optionally, in this embodiment of the present application, the first corresponding relationship may be pre-configured in the terminal device, or may be configured by the network device. The embodiments of the present application are not limited thereto.

Optionally, in an embodiment of the present application, the plurality of resource pools may also correspond to a plurality of speed ranges. The corresponding relationship between the plurality of resource pools and the plurality of speed ranges may be pre-configured, or may also be configured by the network side. The embodiments of the present application are not limited thereto. When data transmission is performed by the terminal device, a corresponding speed range can be determined according to the current moving speed. Further, a resource pool corresponding to the speed range can be determined based on the corresponding relationship between the plurality of resource pools and the plurality of speed ranges. Furthermore, the DMRS pattern corresponding to the resource pool can be determined according to the first corresponding relationship, so that data transmission can be performed according to the DMRS pattern.

In summary, there is a corresponding relationship between the resource pools and the speed ranges, and another corresponding relationship between the resource pools and the DMRS patterns, accordingly, there is also a corresponding relationship between the speed ranges and the DMRS patterns. Accordingly, the DMRS patterns corresponding to a low-speed range may be sparsely distributed in the time domain, while the DMRS patterns corresponding to a high-speed range may be densely distributed in the time domain.

In the embodiment 3, the terminal device determines the DMRS pattern corresponding to the first channel according to the carrier used by the first channel.

Optionally, the terminal device determining the DMRS pattern corresponding to the first channel according to at least one of configuration information sent by the network device, a resource pool used by the first channel, a carrier used by the first channel, or a waveform used by the first channel includes a following step.

The terminal device determines the DMRS pattern corresponding to the first channel according to the carrier used by the first channel and a second corresponding relationship, where the second corresponding relationship is a corresponding relationship between a plurality of carriers and a plurality of DMRS patterns.

In other words, in the embodiment, there is a corresponding relationship between the plurality of carriers and the plurality of DMRS patterns. The terminal device may determine the corresponding DMRS pattern according to the carrier used for transmitting the first channel in combination with the second corresponding relationship, and then demodulate the first channel according to the DMRS pattern.

Optionally, the corresponding relationship between the plurality of carriers and the plurality of DMRS patterns may be in the manner of one-to-one, one-to-many (e.g., one carrier corresponds to two DMRS patterns), many-to-one (e.g., two carriers correspond to one DMRS patterns) or many-to-many (e.g., two carriers correspond to two DMRS patterns), which is not limited by embodiments of the application.

For example, in the IoV system, the terminal device may support the plurality of carriers, and each carrier may correspond to a respective DMRS pattern. For example, for a terminal device that is backward compatible with Rel-14 or Rel-15, a DMRS pattern used by a carrier that supports Rel-14 or Rel-15 may be the existing DMRS pattern of Rel-14, while other carriers may use other DMRS patterns. In an exemplary implementation, the corresponding relationship between the carriers and the DMRS may be determined in the manner pre-configuring or configured by the network device, which is not limited in the embodiments of the present application.

In the embodiment 4, the terminal device determines the DMRS pattern corresponding to the first channel according to the waveform used by the first channel.

Optionally, the terminal device determining the DMRS pattern corresponding to the first channel according to at least one of configuration information sent by the network device, a resource pool used by the first channel, a carrier used by the first channel, or a waveform used by the first channel includes a following step.

The terminal device determines the DMRS pattern corresponding to the first channel according to the waveform used by the first channel and a third corresponding relationship, where the third corresponding relationship is a corresponding relationship of a plurality of waveforms and a plurality of DMRS patterns.

In other words, in this embodiment 4, there is a corresponding relationship between the plurality of waveforms and the plurality of DMRS patterns. The terminal device can determine a corresponding DMRS pattern according to the waveform used for transmitting the first channel in combination with the third corresponding relationship, and then demodulate the first channel according to the DMRS pattern.

Optionally, the corresponding relationship between the plurality of waveforms and the plurality of DMRS patterns may be in the manner of one-to-one, one-to-many (e.g., one waveform corresponds to two DMRS patterns), many-to-one (e.g., two waveforms correspond to one DMRS patterns) or many-to-many (e.g., two waveforms correspond to two DMRS patterns), which is not limited by embodiments of the application.

For example, in the IoV system, the terminal device may support the plurality of waveforms, and the plurality of waveforms may correspond to respective DMRS patterns. For example, the terminal device supports two waveforms, including a cyclic prefix OFDM (CP-OFDM) waveform and a discrete Fourier transform (DFT-OFDM) waveforms, where the CP-OFDM waveform and the DFT-OFDM waveform may correspond to different DMRS patterns respectively. It may be determined based on the characteristics of different waveforms with respect to which DMRS pattern is to be used. For example, as to the DFT-OFDM waveform, in order to maintain its single-carrier characteristics, the corresponding DMRS pattern may be configured in such a way that DMRS symbols and data symbols therein are time division multiplexed (TDM). For another example, as to the CP-OFDM waveform, in order to maintain its flexibility in resource allocation, the corresponding DMRS pattern may be configured in such a way that DMRS symbols therein are discretely embedded in the data channel.

Similar to the first corresponding relationship and the second corresponding relationship, the third corresponding relationship may also be pre-configured in the terminal device, or may be configured by the network device. The embodiments of the present application are not limited thereto.

In the embodiment 5, the terminal device determines the DMRS pattern corresponding to the first channel according to a numerology used by the first channel.

Optionally, as an embodiment, the terminal device determining the DMRS pattern corresponding to the first channel includes a following step.

The terminal device determines the DMRS pattern corresponding to the first channel according to the numerology used by the first channel.

Specifically, in the embodiment 5, there is a corresponding relationship between the plurality of numerologies and the plurality of DMRS patterns. The terminal device may determine the corresponding DMRS pattern according to the numerology used for transmitting the first channel in combination with the fourth corresponding relationship, and then demodulate the first channel according to the DMRS pattern.

Optionally, the corresponding relationship between the plurality of numerologies and the plurality of DMRS patterns may be in the manner of one-to-one, one-to-many (e.g., one numerology corresponds to two DMRS patterns), many-to-one (e.g., two numerologies correspond to one DMRS patterns) or many-to-many (e.g., two numerologies correspond to two DMRS patterns), which is not limited by embodiments of the application.

As an example without limitation, the numerology includes at least one of the following information: information on subcarrier spacing size, a cyclic prefix (CP) type, or a CP length, or may also include other parameters used for data transmission. Embodiments of the application are not limited thereto.

For example, in the IoV system, the terminal device can support a plurality of subcarrier intervals (e.g., 15 kHz, 130 kHz, 60 kHz, and 120 kHz), and the plurality of subcarrier intervals may correspond to respective DMRS patterns, so that the terminal device can determine the corresponding DMRS pattern according to the subcarrier spacing used by the first channel.

For another example, the terminal device may support different CP types, for example, a normal CP and an extended CP, and different CP types may correspond to different DMRS patterns, so that the terminal device may determine the corresponding DMRS pattern according to the CP type used by the first channel.

For another example, different CP lengths may correspond to respective DMRS patterns, so that the terminal device may determine the corresponding DMRS pattern according to the CP length used by the first channel.

It should be understood that, the foregoing manner of indirectly indicating the DMRS pattern through the numerology of the first channel, for example, subcarrier spacing, CP type or CP length, is only an example, and should not constitute any limitation to the embodiments of the present application. The terminal device may also determine the DMRS pattern according to other parameters used for transmitting the first channel, for example, the number of time domain symbols occupied by the first channel, the number of time domain symbols occupied by a subframe or a time slot where the first channel is located, and the like.

Similar to the foregoing first corresponding relationship, second corresponding relationship, and third corresponding relationship, the fourth corresponding relationship may also be pre-configured in the terminal device, or may be configured by the network device. Embodiments of the application are not limited thereto.

It should be understood that in the embodiments of the present application, when the first corresponding relationship, the second corresponding relationship, the third corresponding relationship, and the fourth corresponding relationship are configured by the network device, the network device may configure the first corresponding relationship, the second corresponding relationship, the third corresponding relationship and the fourth corresponding relationship through the same configuration information or through multiple pieces of configuration information. Embodiments of the application are not limited thereto.

It should be noted that, in the embodiments of the present application, the corresponding DMRS pattern can be determined for either PSCCH or PSSCH in the manner described in the foregoing embodiments 1 to 4, or it may also be determined in at least two manners described in the foregoing embodiments 1 to 4. Embodiments of the application are not limited thereto.

For example, when the terminal device is able to receive the configuration information sent by the network device, the terminal device may preferentially perform data transmission according to the DMRS pattern indicated by the configuration information sent by the network device. Optionally, when the terminal device has not received the configuration information from the network device, the terminal device may determine the DMRS pattern corresponding to the first channel according to at least one of the resource pool, carrier, and waveform used by the first channel.

Optionally, in an embodiment of the present application, the terminal device may also be configured with a corresponding relationship between at least two of the resource pool, carrier, and waveform and the DMRS sequence. Therefore, the terminal device may determine the DMRS sequence corresponding to the first channel according to the at least two of the resource pool, carrier, and waveform used by the first channel and the forgoing corresponding relationship. For an exemplary embodiment, reference may be made to the related description in the foregoing embodiments, and details are not described herein again.

For example, the DMRS patterns corresponding to the two waveforms, CP-OFDM and DFT-OFDM, are configured through pre-configuration or network configuration. For each waveform, different resource pools may also correspond to different DRMS patterns. In this way, the terminal device can determine the target DRMS pattern used by the channel based on the waveform and the resource pool used by the channel. For example, the corresponding relationship may be as shown in Table 1.

TABLE 1

| Waveform | Resource Pool | DMRS Pattern |
|---|---|---|
| CP-OFDM | First Resource Pool | First DMRS Pattern |
| | Second Resource Pool | Second DMRS Pattern |
| DFT-OFDM | Third Resource Pool | Third DMRS Pattern |
| | Fourth Resource Pool | Fourth DMRS Pattern |

For example, when the waveform used by the first channel is DFT-OFDM and the resource pool used is the third resource pool, then according to Table 1, the terminal device may determine that the target DMRS pattern used by the first channel is the third DMRS pattern.

Therefore, in the method for transmitting data in IoV according to the embodiment of the present application, the terminal device may determine the DMRS pattern corresponding to the first channel according to at least one of configuration of the network device, the resource pool, the carrier, and the waveform used for transmitting the first channel, thereby achieving flexible configuration of the DMRS pattern.

Optionally, in some scenarios, the DMRS pattern corresponding to PSCCH may be predetermined, for example, may be determined according to the manner described in the foregoing embodiments 1 to 5. In some embodiments, the terminal device may also determine the DMRS sequence corresponding to PSSCH according to the PSCCH corresponding to the PSSCH. Hereinafter, a specific implementation manner of determining the DMRS sequence corresponding to the PSSCH according to the PSCCH will be described in detail with reference to embodiments 6 to 9.

In the embodiment 6, the DMRS sequence corresponding to the PSSCH is explicitly indicated by indication information in the PSCCH.

Specifically, the PSCCH may carry indication information therein, and the indication information is used for indicating the DMRS pattern corresponding to the PSSCH. After receiving the PSCCH, the terminal device may demodulate the PSCCH according to the DMRS pattern corresponding to the PSCCH, obtain the indication information included in the PSCCH and, further, determine that a DMRS pattern indicated by the indication information as the DMRS pattern corresponding to the PSSCH.

Similar to the foregoing embodiment, the terminal device may also be configured with a plurality of DMRS patterns. The plurality of DMRS patterns are DMRS patterns corresponding to the PSSCH. The terminal device may indicate the DRMS pattern used by the PSSCH by carrying indication information in the PSCCH. Optionally, the indication information may be K-bit indication information, and a specific length thereof may be determined according to the number of the DMRS patterns, which is not limited in this embodiment of the present application.

In the embodiment 7, The DMRS sequence corresponding to the PSSCH is implicitly indicated by the DMRS of the PSCCH.

In this embodiment 7, the terminal device may indirectly indicate the DMRS pattern corresponding to the PSSCH through the DMRS of the PSCCH. Optionally, there may be a fifth corresponding relationship between at least one of sequence, cyclic shift, orthogonal cover code (OCC), resource position and root sequence corresponding to the DMRS of the PSCCH and the DMRS patterns of the PSSCH. Accordingly, the terminal device can determine the DMRS sequence used by the PSSCH based on the at least one of sequence, cyclic shift, OCC, resource position and root sequence corresponding to the DMRS used by the PSCCH, in combination with the fifth corresponding relationship. The specific implementation process thereof is similar to those described in embodiments 2 to 5 and will not be repeated here. In an embodiment, the sequence, cyclic shift, OCC, resource position and root sequence corresponding to the DMRS used by the PSCCH of the terminal device may be configured by the network, or may be determined by the terminal device independently. The fifth corresponding relationship may be pre-configured in the terminal device or configured by the network.

In the embodiment 8, the DMRS pattern corresponding to the PSSCH is implicitly indicated by scrambling code information of the PSCCH.

Specifically, the terminal device may scramble information bits of the PSCCH. Accordingly, the terminal device may implicitly indicate the DMRS pattern corresponding to the PSSCH through different scrambling code information (or scrambling code sequences). Optionally, there may be a sixth corresponding relationship between the scrambling code information of the PSCCH and the DMRS patterns of the PSSCH. In this way, the terminal device may determine the DMRS pattern used by the PSSCH based on the scrambling code information of the PSCCH and the sixth corresponding relationship. Further, the terminal device can perform data transmission according to the DMRS pattern. In an embodiment, the scrambling code information (or scrambling code sequences) used by the PSCCH of the terminal device may be configured by the network or selected by the terminal autonomously. The sixth corresponding relationship may be pre-configured in the terminal device or configured by the network.

Optionally, the scrambling code information of the PSCCH may be determined by an RNTI (Radio Network Temporary Identity), where the RNTI may include one of the following, for example, the C-RNTI (Cell Radio Network Temporary Identity Identifier) or P-RNTI (paging RNTI), and the like, which are not limited in the embodiments of the present application.

In the embodiment 9, the DMRS pattern corresponding to the PSSCH is implicitly indicated by mask code information of the PSCCH.

Specifically, after the information bits of the PSCCH are scrambled, they can also be masked. Therefore, the terminal device can implicitly indicate the DMRS pattern corresponding to the PSSCH through different mask code information (or mask code sequences). Optionally, there may be a seventh corresponding relationship between the mask code information of the PSCCH and the DMRS patterns of the PSSCH. In this way, the terminal device may determine the DMRS pattern used by the PSSCH based on the mask code information of the PSCCH and the seventh corresponding relationship. Furthermore, the terminal device can perform data transmission according to the DMRS pattern. In an embodiment, the mask code information (or mask code sequences) used by the PSCCH of the terminal device may be configured by the network or selected by the terminal autonomously. The seventh corresponding relationship may be pre-configured in the terminal device or configured by the network.

In summary, the terminal device may determine the DMRS pattern corresponding to the PSCCH according to the methods described in the embodiments 1 to 5, and may also determine the DMRS pattern corresponding to the PSSCH according to the methods described in the embodiments 1 to 5. Optionally, the terminal device may determine the DMRS pattern corresponding to the PSCCH according to the methods described in the embodiments 1 to 5, and determine the DMRS pattern corresponding to the PSSCH according to the methods described in the embodiments 6 to 9. Embodiments of the present application are not limited thereto.

The method for transmitting data according to embodiments of the present application is described in detail from the perspective of a terminal device above with reference to FIG. 2, and the method for transmitting data according to other embodiments of the present application will be described in detail below with reference to FIG. 3 from the perspective of a network device. It should be understood that the description from the network device side and the description from the terminal device side correspond to each other, similar descriptions can be referred to forgoing embodiments and, for avoiding repetition, will be not repeated here.

FIG. 3 is a schematic flowchart illustrating a data transmission method 300 according to another embodiment of the present application. The method 300 may be performed by the network device in the IoV system shown in FIG. 1. As shown in FIG. 3, the method 300 includes the following steps.

S310, the network device determines configuration information, where the configuration information is used by the terminal device to determine a DMRS pattern corresponding to the first channel.

S320, the network device sends the configuration information to the terminal device.

Optionally, in some embodiments, the configuration information is used for indicating a first DMRS pattern among a plurality of DMRS patterns.

Optionally, in some embodiments, the method further includes:

configuring, by the network device, the terminal device with the plurality of DRMS patterns.

Optionally, in some embodiments, the configuration information is used for indicating a first corresponding relationship, the first corresponding relationship being a corresponding relationship between a plurality of resource pools and a plurality of DMRS patterns.

Optionally, in some embodiments, the configuration information is used for indicating a second corresponding relationship, the second corresponding relationship being a corresponding relationship between a plurality of carriers and a plurality of DMRS patterns.

Optionally, in some embodiments, the configuration information is used for indicating a third corresponding relationship, the third corresponding relationship being a corresponding relationship between a plurality of waveforms and a plurality of DMRS patterns.

Optionally, in some embodiments, the configuration information is used for indicating a fourth corresponding relationship, the fourth corresponding relationship being a corresponding relationship between a plurality of numerologies and a plurality of DMRS patterns.

Optionally, in some embodiments, the numerology includes at least one of following information: information on subcarrier spacing size, a cyclic prefix (CP) type, or a CP length.

Optionally, in some embodiments, the first channel is a physical sidelink control channel (PSCCH).

Optionally, in some embodiments, the first channel is a physical sidelink channel share channel (PSSCH), and the physical sidelink control channel (PSCCH) corresponding to the first channel is a second channel.

Optionally, in some embodiments, the configuration information is used for indicating a corresponding relationship between at least one of a sequence, a cyclic shift, an orthogonal cover code (OCC), a resource position, or a root sequence of DMRS corresponding to the second channel and a DMRS sequence.

Optionally, in some embodiments, the configuration information is used for indicating a corresponding relationship between scrambling code information of the second channel and a DMRS sequence.

Optionally, in some embodiments, the configuration information is used for indicating a corresponding relationship between mask code information of the second channel and a DMRS sequence.

Optionally, in some embodiments, the DMRS pattern includes at least one of the following:

the number of an orthogonal frequency division multiplexing (OFDM) symbol occupied by DRMS within one time unit;

a position of an OFDM symbol occupied by DRMS within one time unit;

the number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

The method embodiments of the present application are described in detail above with reference to FIGS. 2 and 3, and the device embodiments of the present application will be described in detail below with reference to FIGS. 4 to 7. It should be understood that the device embodiments correspond to the method embodiments and, thus, similar description thereof may refer to the method embodiments.

FIG. 4 is a block diagram illustrating a terminal device 400 according to an embodiment of the present application. As shown in FIG. 4, the terminal device 400 includes:

a determining module 410, configured to determine a DMRS pattern corresponding to a first channel; and a demodulating module 420, configured to demodulate the first channel according to the DMRS pattern.

Optionally, in some embodiments, the determining module 410 is configured to:

determine the DMRS pattern corresponding to the first channel according to at least one of configuration information sent by a network device, a resource pool used by the first channel, a carrier used by the first channel, or a waveform used by the first channel.

Optionally, in some embodiments, the determining module 410 is specifically configured to:

determine, when the configuration information indicates a first DMRS pattern, the first DMRS pattern from a plurality of DMRS patterns as the DRMS pattern corresponding to the first channel.

Optionally, in some embodiments, the plurality of DMRS patterns are pre-configured in the terminal device or configured by the network device.

Optionally, in some embodiments, the determining module 410 is specifically configured to:

determine the DMRS pattern corresponding to the first channel according to the resource pool used by the first channel and a first corresponding relationship, wherein the first corresponding relationship is a corresponding relationship between a plurality of resource pools and a plurality of DMRS patterns.

Optionally, in some embodiments, the plurality of resource pools respectively correspond to a plurality of speed ranges, and the determining module 410 is further configured to:

determine a corresponding target resource pool according to a current moving speed, wherein the target resource pool is the resource pool used by the first channel.

Optionally, in some embodiments, the first corresponding relationship is pre-configured in the terminal device or configured by the network device.

Optionally, in some embodiments, the determining module 410 is specifically configured to:

determine the DMRS pattern corresponding to the first channel according to the carrier used by the first channel and a second corresponding relationship, wherein the second corresponding relationship is a corresponding relationship between a plurality of carriers and a plurality of DMRS patterns.

Optionally, in some embodiments, the second corresponding relationship is pre-configured in the terminal device or configured by the network device.

Optionally, in some embodiments, the determining module 410 is specifically configured to:

determine the DMRS pattern corresponding to the first channel according to the waveform used by the first channel and a third corresponding relationship, wherein the third corresponding relationship is a corresponding relationship between a plurality of waveforms and a plurality of DMRS patterns.

Optionally, in some embodiments, the third corresponding relationship is pre-configured in the terminal device or configured by the network device.

Optionally, in some embodiments, the determining module 410 is further configured to determine the DMRS pattern corresponding to the first channel according to a numerology used by the first channel.

Optionally, in some embodiments, the determining module 410 is specifically configured to:

determine the DMRS pattern corresponding to the first channel according to the numerology used by the first channel and a fourth corresponding relationship, wherein the fourth corresponding relationship is a corresponding relationship between a plurality of numerologies and a plurality of DMRS patterns.

Optionally, in some embodiments, the fourth corresponding relationship is pre-configured in the terminal device or configured by the network device.

Optionally, in some embodiments, the numerology includes at least one of following information: information on subcarrier spacing size, a cyclic prefix (CP) type, or a CP length.

Optionally, in some embodiments, the first channel is a physical sidelink share channel (PSSCH), or the first channel is a physical sidelink control channel (PSCCH).

Optionally, in some embodiments, the first channel is a physical sidelink share channel (PSSCH), a physical sidelink control channel (PSCCH) corresponding to the first channel is a second channel, and the determining module 410 is configured to:

determine the DMRS pattern corresponding to the first channel according to the second channel.

Optionally, in some embodiments, the second channel includes indication information used for indicating a second DRMS pattern, and the determining module 410 is specifically used to:

determine a second DMRS pattern indicated by the indication information as the DMRS pattern corresponding to the first channel.

Optionally, in some embodiments, the determining module 410 is specifically configured to:

determine the DMRS pattern corresponding to the first channel according to at least one of a sequence, a cyclic shift, an orthogonal cover code (OCC), a resource position, or a root sequence of DMRS corresponding to the second channel.

Optionally, in some embodiments, the determining module 410 is specifically configured to:

determine the DMRS pattern corresponding to the first channel according to scrambling code information of the second channel.

Optionally, in some embodiments, the determining module 410 is specifically configured to:

determine the DMRS pattern corresponding to the first channel according to mask code information of the second channel.

Optionally, in some embodiments, the DMRS pattern includes at least one of the following:

the number of an orthogonal frequency division multiplexing (OFDM) symbol occupied by DRMS within one time unit;

a position of an OFDM symbol occupied by DRMS within one time unit;

the number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

It should be understood that the terminal device 400 according to the embodiments of the present application may correspond to the terminal device in the method embodiments of the present application, and the above-mentioned and other operations and/or functions of the units in the terminal device 400 are used for implementing the corresponding process of the terminal device in the method 200 shown in FIG. 2 and, for the sake of brevity, will not be repeated here.

Figure 5:
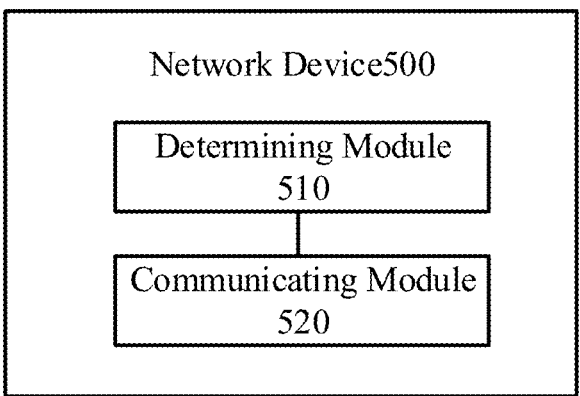
FIG. 5 is a block diagram illustrating a network device according to another embodiment of the present application.

FIG. 5 is a block diagram illustrating a network device according to an embodiment of the present application. The network device 500 of FIG. 5 includes:

a determining module 510, configured to determine configuration information used by a terminal device to determine a DMRS pattern corresponding to a first channel;

a communicating module 520, configured to send the configuration information to the terminal device.

Optionally, in some embodiments, the configuration information is used for indicating a first DMRS pattern among a plurality of DMRS patterns.

Optionally, in some embodiments, the communicating module 520 is further configured to:

configure the terminal device with the plurality of DRMS patterns.

Optionally, in some embodiments, the configuration information is used for indicating a first corresponding relationship, the first corresponding relationship being a corresponding relationship between a plurality of resource pools and a plurality of DMRS patterns.

Optionally, in some embodiments, the configuration information is used for indicating a second corresponding relationship, the second corresponding relationship being a corresponding relationship between a plurality of carriers and a plurality of DMRS patterns.

Optionally, in some embodiments, the configuration information is used for indicating a third corresponding relationship, the third corresponding relationship being a corresponding relationship between a plurality of waveforms and a plurality of DMRS patterns.

Optionally, in some embodiments, the configuration information is used for indicating a fourth corresponding relationship, the fourth corresponding relationship being a corresponding relationship between a plurality of numerologies and a plurality of DMRS patterns.

Optionally, in some embodiments, the numerology includes at least one of following information: information on subcarrier spacing size, a cyclic prefix (CP) type, or a CP length.

Optionally, in some embodiments, the first channel is a PSCCH.

Optionally, in some embodiments, the first channel is a PSSCH, and the PSCCH corresponding to the first channel is a second channel.

Optionally, in some embodiments, the configuration information is used for indicating a corresponding relationship between at least one of a sequence, a cyclic shift, an orthogonal cover code (OCC), a resource position, or a root sequence of DMRS corresponding to the second channel and a DMRS sequence.

Optionally, in some embodiments, the configuration information is used for indicating a corresponding relationship between scrambling code information of the second channel and a DMRS sequence.

Optionally, in some embodiments, the configuration information is used for indicating a corresponding relationship between mask code information of the second channel and a DMRS sequence.

Optionally, in some embodiments, the DMRS pattern includes at least one of the following:

the number of an orthogonal frequency division multiplexing (OFDM) symbol occupied by DRMS within one time unit;

a position of an OFDM symbol occupied by DRMS within one time unit;

the number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

Specifically, the network device 500 may correspond to (e.g., may be configured in or itself is) the network device described in the above method 300, and each module or unit in the network device 500 is configured to perform each action or processing procedure performed by the network device in the above method 300 respectively. In order to avoid redundant description, a detailed description thereof is omitted here.

Figure 6:
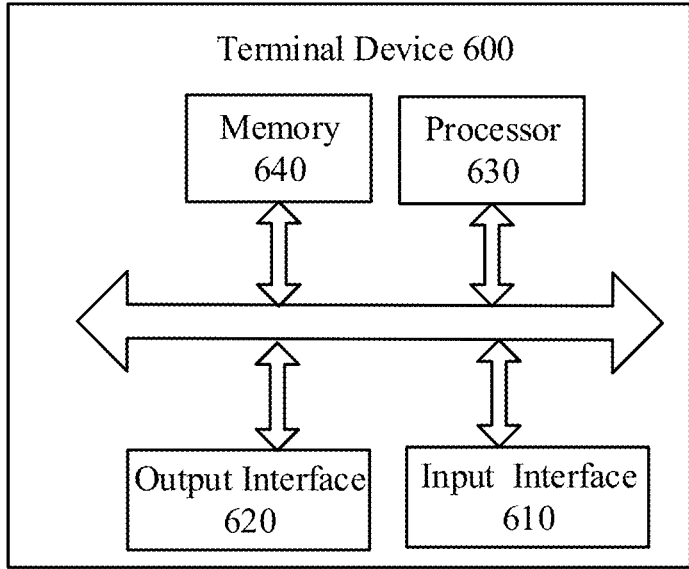
FIG. 6 is a block diagram illustrating a terminal device according to an embodiment of the present application.

As shown in FIG. 6, an embodiment of the present application further provides a terminal device 600. The terminal device 600 may be the terminal device 400 in FIG. 4, which can be configured to perform the operations corresponding to the terminal device in the method 200 shown in FIG. 2. The terminal device 600 includes: an input interface 610, an output interface 620, a processor 630, and a memory 640. The input interface 610, the output interface 620, the processor 630, and the memory 640 may be connected through a bus system. The memory 640 is configured to store programs, instructions or codes. The processor 630 is configured to execute programs, instructions, or codes in the memory 640 to control the input interface 610 to receive signals, control the output interface 620 to send signals, and perform operations in the foregoing method embodiments.

It should be understood that in the embodiment of the present application, the processor 630 may be a central processing unit (CPU), and the processor 630 may also be other general-purpose processors or digital signal processors (DSP), application specific integrated circuit (ASIC), field programmable gate array (FPGA), or other programmable logic devices, discrete gate or transistor logic devices, discrete hardware components, and the like. The general-purpose processor may be a microprocessor, or the processor may also be any conventional processor or the like.

The memory 640 may include a read-only memory and a random access memory, and provide instructions and data to the processor 630. A portion of the memory 640 may also include non-volatile random access memory. For example, the memory 640 may also store device type information.

In an embodiment, each operation of the above method may be completed by an integrated logic circuit of hardware in the processor 630 or instructions in the form of software. The content of the method disclosed in conjunction with the embodiments of the present application may be directly embodied and executed by a hardware processor, or may be executed and completed by a combination of hardware and software modules in the processor. The software module may be located in a non-transitory computer-readable storage medium in the art, such as random access memory, flash memory, read-only memory, programmable read-only memory, or electrically erasable programmable memory, and registers. The storage medium is located in the memory 640, and the processor 630 reads information from the memory 640 and performs operations of the above method in combination with its hardware. In order to avoid repetition, they will not be described in detail here.

In an exemplary embodiment, the determining module 410 included in the terminal device 400 in FIG. 4 may be implemented by the processor 630 in FIG. 6, and the demodulating module 420 included in the terminal device 400 in FIG. 4 may be implemented by the input interface 610 and the output interface 620 in FIG. 6.

Figure 7:
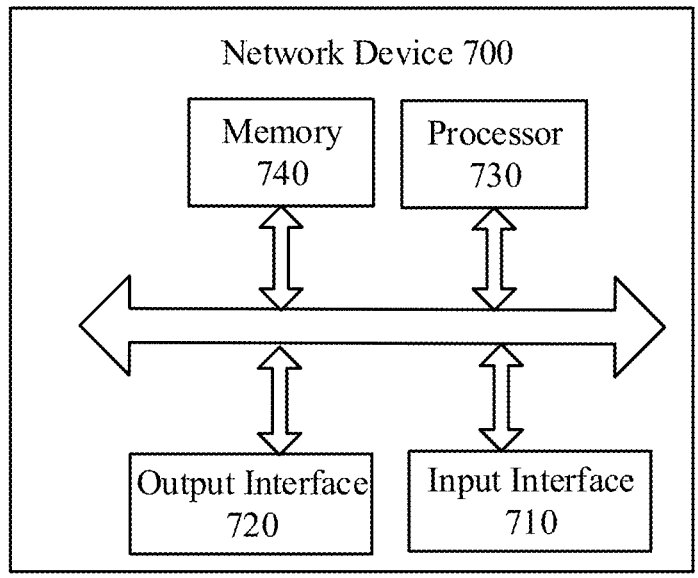
FIG. 7 is a block diagram illustrating a network device according to another embodiment of the present application.

As shown in FIG. 7, an embodiment of the present application further provides a network device 700. The network device 700 may be the network device 500 in FIG. 5, which can be configured to perform operations corresponding to the network device in the method 300 shown in FIG. 3. The network device 700 includes an input interface 710, an output interface 720, a processor 730, and a memory 740. The input interface 710, the output interface 720, the processor 730, and the memory 740 may be connected through a bus system. The memory 740 is configured to store programs, instructions or codes. The processor 730 is configured to execute programs, instructions, or codes in the memory 740 to control the input interface 710 to receive signals, control the output interface 720 to send signals, and perform operations in the foregoing method embodiments.

It should be understood that in the embodiment of the present application, the processor 730 may be a central processing unit (CPU), and the processor 730 may also be other general-purpose processors or digital signal processors (DSP), application specific integrated circuit (ASIC), field programmable gate array (FPGA), or other programmable logic devices, discrete gate or transistor logic devices, discrete hardware components, and the like. The general-purpose processor may be a microprocessor, or the processor may also be any conventional processor or the like.

The memory 740 may include a read-only memory and a random access memory, and provide instructions and data to the processor 730. A portion of the memory 740 may also include non-volatile random access memory. For example, the memory 740 may also store device type information.

In an embodiment, each operation of the above method may be completed by an integrated logic circuit of hardware in the processor 730 or instructions in the form of software. The content of the method disclosed in conjunction with the embodiments of the present application may be directly embodied and executed by a hardware processor, or may be executed and completed by a combination of hardware and software modules in the processor. The software module may be located in a non-transitory computer-readable storage medium in the art, such as random access memory, flash memory, read-only memory, programmable read-only memory, or electrically erasable programmable memory, and registers. The storage medium is located in the memory 740, and the processor 730 reads the information from the memory 740 and performs operations of the above method in combination with its hardware. In order to avoid repetition, they will not be described in detail here.

In an exemplary embodiment, the determining module 510 included in the network device 500 in FIG. 5 may be implemented by the processor 730 in FIG. 7, and the communicating module 520 included in the network device 500 in FIG. 5 may be implemented by the input interface 710 and the output interface 720 in FIG. 7.

Figure 8:
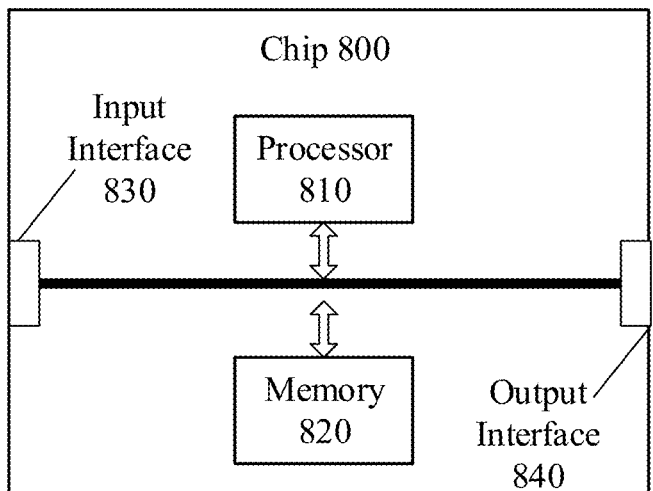
FIG. 8 is a block diagram illustrating a chip according to an embodiment of the present application.

FIG. 8 is a block diagram illustrating a chip according to an embodiment of the present application. The chip 800 shown in FIG. 8 includes a processor 810, and the processor 810 can call and run a computer program from a memory to implement the method in the embodiment of the present application.

Optionally, as shown in FIG. 8, the chip 800 may further include a memory 820. The processor 810 can call and run a computer program from the memory 820 to implement the method in the embodiments of the present application.

The memory 820 may be a separate device independent of the processor 810, or may be integrated in the processor 810.

Optionally, the chip 800 may further include an input interface 830. The processor 810 can control the input interface 830 to communicate with other devices or chips. Specifically, it can obtain information or data sent by other devices or chips.

Optionally, the chip 800 may further include an output interface 840. The processor 810 can control the output interface 840 to communicate with other devices or chips. Specifically, it can output information or data to other devices or chips.

Optionally, the chip may be applied to the network device in the embodiment of the present application, and the chip may implement the corresponding process implemented by the network device in each method of the embodiment of the present application. Details will be omitted here for the sake of brevity.

Optionally, the chip can be applied to the mobile terminal/terminal device in the embodiments of the present application, and the chip can implement the corresponding process implemented by the mobile terminal/terminal device in each method of the embodiments of the present application. Details will be omitted here for the sake of brevity.

It should be understood that the chips mentioned in the embodiments of the present application may also be referred to as system-on-chips, system chips, chip systems, or system-on-chip chips.

Figure 9:
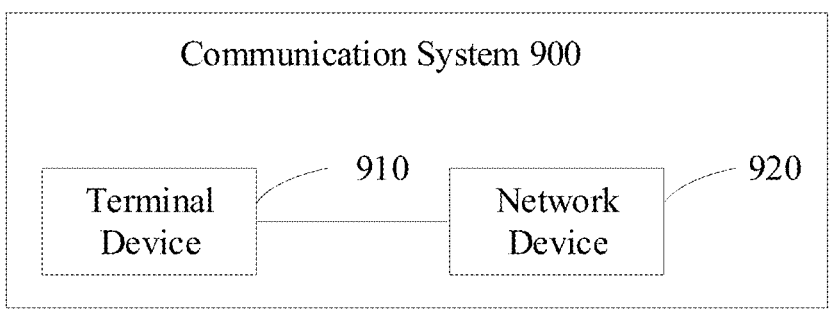
FIG. 9 is a block diagram illustrating a communication system according to an embodiment of the present application.

FIG. 9 is a block diagram illustrating a communication system 900 according to an embodiment of the present application. As shown in FIG. 8, the communication system 900 includes a terminal device 910 and a network device 920.

Herein, the terminal device 910 may be configured to implement the functions corresponding to the terminal device in the above method, and the network device 920 may be configured to implement the functions implemented corresponding to the network device in the above method.

It should be understood that the processor in the embodiment of the present application may be an integrated circuit chip, which has signal processing capabilities. In an implementation process, each step of the foregoing method embodiment may be completed by an integrated logic circuit of hardware in a processor or instructions in the form of software. The foregoing processor may be a general-purpose processor, a digital signal processor (DSP), an application specific integrated circuit (ASIC), a field programmable gate array (FPGA), or other available programming logic devices, discrete gates or transistor logic devices, discrete hardware components. The methods, steps, and logical block diagrams disclosed in the embodiments of the present application may be implemented or executed. The general-purpose processor may be a microprocessor or the processor may be any conventional processor or the like. The steps of the method disclosed in conjunction with the embodiments of the present application may be directly embodied and executed by a hardware decoding processor, or may be executed and completed by a combination of hardware and software modules in the decoding processor. The software module may be located in a non-transitory computer-readable storage medium in the art, such as random access memory, flash memory, read-only memory, programmable read-only memory, or electrically erasable programmable memory, and registers. The storage medium is located in the memory, and the processor reads the information from the memory and perform the steps of the above method in combination with its hardware.

It can be understood that the memory in the embodiments of the present application may be volatile memory or non-volatile memory, or may include both volatile and non-volatile memory. In an embodiment, the non-volatile memory may be read-only memory (ROM), programmable read-only memory (PROM), erasable programmable read-only memory (EPROM), electronically erasable programmable read only memory (EEPROM) or flash memory. The volatile memory may be a random access memory (RAM), which is used as an external cache. By way of example without limitation, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchronous connection dynamic random access memory (SLDRAM) and direct memory bus random access memory (DR RAM). It should be noted that the memories of the systems and methods described herein are intended to include, but are not limited to these and any other suitable types of memories.

It should be understood that the foregoing memory is exemplary but not limiting, for example, the memory in the embodiments of the present application may also be static random access memory (SRAM), dynamic random access memory (DRAM), Synchronous dynamic random access memory (SDRAM), double data rate synchronous dynamic random access memory (DDR SDRAM), enhanced synchronous dynamic random access memory (ESDRAM), synchronous connection Dynamic random access memory (SLDRAM) and direct memory bus random access memory (DR RAM), and the like. That is to say, the memories in the embodiments of the present application are intended to include but are not limited to these and any other suitable types of memories.

Embodiments of the present application also provide a non-transitory computer-readable storage medium that stores one or more programs, the one or more programs include instructions which, when being executed by a portable electronic device that includes multiple application programs, causes the portable electronic device to perform the method according to the embodiments shown in FIGS. 2 and 3.

An embodiment of the present application also proposes a computer program including instructions. When the computer program is executed by a computer, the computer can execute the corresponding operations of the method in the embodiments shown in FIGS. 2 and 3.

Those of ordinary skill in the art may realize that the units and algorithm steps of the examples described in conjunction with the embodiments disclosed herein can be implemented by electronic hardware, or a combination of computer software and electronic hardware. Whether these functions are executed in hardware or software depends on the specific application of the technical solution and design constraints. Those skilled in the art can use different methods to implement the described functions for each specific application, but such implementation should not be considered beyond the scope of this application.

Those skilled in the art can clearly understand that, for the convenience and conciseness of the description, the specific working process of the system, device and unit described above can refer to the corresponding process in the foregoing method embodiments, which will not be repeated here.

In the several embodiments provided in this application, it should be understood that the disclosed system, device, and method may be implemented in other ways. For example, the device embodiments described above are only schematic. For example, the division of the units is only a division of logical functions. In actual implementation, there may be other divisions, for example, multiple units or components may be combined or integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or may be distributed at multiple network units. Some or all of the units may be selected according to actual needs to achieve the purpose of the solution of this embodiment.

In addition, each functional unit in each embodiment of the present application may be integrated into one processing unit, or each unit may exist alone physically, or two or more units may be integrated into one unit.

If the functions are implemented in the form of software functional units and sold or used as independent products, they can be stored in a non-transitory computer-readable storage medium. Based on such an understanding, the technical solution of the present application may be essentially or a part that contributes to the existing technology or a part of the technical solution may be embodied in the form of a software product, the computer software product is stored in a non-transitory computer-readable storage medium, including several instructions to enable a computer device (which may be a personal computer, server, or network device, and the like) to perform all or part of the steps of the methods described in the embodiments of the present application. The foregoing storage medium may include U disk, mobile hard disk, read-only memory (ROM), random access memory (RAM), magnetic disk or optical disk and other media that can store program codes.

The above is only the specific implementation of this application, but the protection scope of this application is not limited to this. Any person skilled in the art can easily think of changes or replacements within the technical scope disclosed in this application, which should be covered by the protection scope of this application. Therefore, the protection scope of the present application shall be subject to the protection scope of the claims.

What is claimed is:

1. A method for transmitting data, comprising:
determining, by a terminal device, a plurality of demodulation reference signal (DMRS) patterns corresponding to a physical sidelink shared channel (PSSCH) according to a resource pool, among a plurality of resource pools, used by the PSSCH and a correspondence between the resource pool and the plurality of DMRS patterns;
determining, by the terminal device from the plurality of DMRS patterns, a DMRS pattern used for demodulating the PSSCH according to indication information carried by a physical sidelink control channel (PSCCH) corresponding to the PSSCH; and
demodulating, by the terminal device, the PSSCH according to the DMRS pattern,
wherein the DMRS pattern comprises a number and a position of an orthogonal frequency division multiplexing (OFDM) symbol occupied by DMRS within one time unit.

2. The method according to claim 1, wherein the DMRS pattern further comprises at least one of:

a number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

3. A terminal device, comprising a processor and a memory, wherein the memory is configured to store instructions, and the processor, when executing the instructions stored in the memory, is configured to:

determine a plurality of demodulation reference signal (DMRS) patterns corresponding to a physical sidelink shared channel (PSSCH) according to a resource pool, among a plurality of resource pools, used by the PSSCH and a correspondence between the resource pool and the plurality of DMRS patterns;

determine, from the plurality of DMRS patterns, a DMRS pattern used for demodulating the PSSCH according to indication information carried by a physical sidelink control channel (PSCCH) corresponding to the PSSCH; and demodulate the PSSCH according to the DMRS pattern, wherein the DMRS pattern comprises a number and a position of an orthogonal frequency division multiplexing (OFDM) symbol occupied by DMRS within one time unit.

4. The terminal device according to claim 3, wherein the DMRS pattern further comprises at least one of:

a number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

5. A network device, comprising a processor and a memory, wherein the memory is configured to store instructions, and the processor, when executing the instructions stored in the memory, is configured to:

determine configuration information, wherein the configuration information is used by a terminal device to determine a plurality of demodulation reference signal (DMRS) patterns corresponding to a physical sidelink shared channel (PSSCH) according to a resource pool, among a plurality of resource pools, used by the PSSCH and a correspondence between the resource pool and the plurality of DMRS patterns, and determine, from the plurality of DMRS patterns, a DMRS pattern used for demodulating the PSSCH according to indication information carried by a physical sidelink control channel (PSCCH) corresponding to the PSSCH; and send the configuration information to the terminal device, wherein the DMRS pattern comprises a number and a position of an orthogonal frequency division multiplexing (OFDM) symbol occupied by DMRS within one time unit.

6. The network device according to claim 5, wherein the DMRS pattern further comprises at least one of:

a number of a resource element (RE) occupied by DMRS in one physical resource block (PRB) within one OFDM symbol occupied by the DMRS;

a frequency domain interval between DMRS symbols in one PRB within one OFDM symbol occupied by the DMRS;

an offset of a DMRS symbol in a PRB relative to an initial subcarrier in the PRB within one OFDM symbol occupied by the DMRS;

a frequency domain position of DMRS within one OFDM symbol occupied by the DMRS; or whether an RE, not occupied by DMRS in an OFDM symbol where the DMRS is located, can be used for transmitting other signals than the DMRS.

7. The method according to claim 1, wherein the indication information comprises K bits, and a value of K is determined according to a number of the plurality of the DMRS patterns corresponding to the PSSCH.

8. The terminal device according to claim 3, wherein the indication information comprises K bits, and a value of K is determined according to a number of the plurality of the DMRS patterns corresponding to the PSSCH.

9. The network device according to claim 5, wherein the indication information comprises K bits, and a value of K is determined according to a number of the plurality of the DMRS patterns corresponding to the PSSCH.

* * * * *